(12) United States Patent
Heiman et al.

(10) Patent No.: US 6,587,034 B1
(45) Date of Patent: Jul. 1, 2003

(54) DATA COMMUNICATION DEVICE

(75) Inventors: Frederic Heiman, Los Gatos, CA (US);
Joseph Katz, Stony Brook, NY (US);
Robert Beach, Los Altos, CA (US);
Andrew R. Werback, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 482 days.

(21) Appl. No.: 09/621,364

(22) Filed: Jul. 21, 2000

Related U.S. Application Data

(62) Division of application No. 09/002,822, filed on Jan. 5, 1998, now abandoned.

(51) Int. Cl.[7] ................................................ G08B 5/22
(52) U.S. Cl. ...................... 340/7.55; 340/7.2; 340/7.29; 340/7.42; 345/1.1; 345/1.2; 345/25; 345/204; 345/698; 345/699; 370/338; 370/346; 370/449; 370/474; 358/1.2; 235/462.13; 235/462.45
(58) Field of Search ............................... 340/7.55, 7.29, 340/7.42, 7.2; 370/338, 346, 349, 449, 474; 455/432, 434, 435; 345/1.1, 1.2, 2.3, 3.3, 23, 25, 204, 698, 699, 3.4; 358/1.2; 235/462.13, 462.45

(56) References Cited

U.S. PATENT DOCUMENTS

| | | | | |
|---|---|---|---|---|
| 5,659,761 A | * | 8/1997 | DeArras et al. | 713/300 |
| 5,726,984 A | * | 3/1998 | Kubler et al. | 370/349 |
| 5,857,156 A | | 1/1999 | Anderson | 455/517 |
| 5,938,726 A | | 8/1999 | Reber et al. | 709/217 |
| 5,940,595 A | | 8/1999 | Reber et al. | 395/200.57 |
| 5,986,651 A | | 11/1999 | Reber et al. | 345/335 |
| 5,995,105 A | | 11/1999 | Reber et al. | 345/356 |
| 6,149,062 A | * | 11/2000 | Danielson et al. | 235/472.01 |

* cited by examiner

*Primary Examiner*—Michael Horabik
*Assistant Examiner*—Yves Daiencourt

(57) ABSTRACT

Simplified data message terminals and data communicating voice terminals are described for providing additional functionality in a facility using a wireless data communication system. The simplified data message terminals provide message and paging communication to employees or customers in a simplified terminal configuration using the existing data communication system. By performing voice to data and data to voice conversions, the same system provides voice communication without interruption of data communication services.

28 Claims, 7 Drawing Sheets

DATA COMMUNICATION DEVICE

RELATED APPLICATIONS

This is a division of Ser. No. 09/002,822 filed on Jan. 5, 1998, which is now abandoned.

BACKGROUND OF THE INVENTION

This invention relates to wireless data communication systems. Such systems are currently used in retail stores, warehouses and health care facilities to enable communication between a central data processing system and fixed or portable terminal units. Such units typically include point-of-sale terminals, personal computers, laptop or notebook personal computers, smaller pen terminals, personal communicators and bar code scanners. One such system which is currently available is the Spectrum 24 System, available from Symbol Technologies, Inc., assignee of this application. The Spectrum 24 System is designed to conform to the IEEE Standard 802.11 and provides a wireless local area network which operates in the 2.4 GHZ frequency band using frequency-hopping, spread-spectrum signaling format. A typical system will include at least one, and typically more than one access point, each of which is capable of providing full duplex data communication to a plurality of associated mobile units and communicating data between those units and a central processor over a wired network. Data communication is provided over 79 discrete frequency channels, with each access point having a unique frequency hop pattern among those channels, selected from 66 hop sequences at a hop-rare of 10 hops per second, wherein the hop sequence is separately synchronized by each access point. The system uses GFSK modulation for data transmission at a data rate of 1 Mbps per channel.

This invention also relates to paging systems, wherein a user is provided with a small, palm-size receiver that responds to a broadcast signal and receives a data message, usually comprising a telephone number to be called by the user. Enhanced paging systems may also provide alphanumeric data messages.

In a business environment using a wireless data communication system, it is possible to send page-like messages to wireless computer terminals. One such system is described in U.S. Pat. No. 5,459,458, wherein there is described a system utilizing wireless communication between a single central station and terminals, such as personal computers, portable computers, notebook computers, personal intelligent communicators, portable wireless terminals and the like, wherein the terminals are programmed to provide a Ivirtualk paging function.

Further, U.S. Pat. No. 5,115,233 describes a system wherein such terminals are arranged to provide voice communication with the central station. As described, data communications are interrupted to enable the system to enter a voice communication mode.

The known systems provide a sophisticated level of data communication, enabling the user of a mobile terminal to manually enter data via a keyboard for communication to the central processor. In many cases it is impractical to provide a sophisticated mobile terminal unit to every employee because of cost considerations, and it is often inconvenient to require a user to carry about a bulky terminal, when only limited message communications are required for the particular user to carry out his or her duties.

It is therefore an object of the present invention to provide highly portable and simplified data communication devices for use in conjunction with a wireless data communication network, Such devices may be simplified paging devices, or may be message units that provide a paging function as well as limited and specific data communications from the user to the central station to signal time card transactions, emergencies, etc. In one embodiment the mobile unit provides voice messaging or voice communications over the data channel without interrupting the normal data handling routine. In another configuration the system can provide added paging communications to a portable bar-code scanner, to enable message signalling to the user. In a still further embodiment, the user can be provided with a message on a separate high-resolution display.

SUMMARY OF THE INVENTION

In accordance with the invention there is provided a portable mobile paging unit for use with a wireless data communication system, which includes at least one access point for radio data communication between a central processor and terminals. In a preferred embodiment, the mobile paging unit is devoid of manual data entry devices and includes a radio communication module arranged to associate with a selected access point of the data communications systems and conduct data communication therewith. The radio communication portion is arranged to receive data communication signals representing alphanumeric messages, and provide received messages to a controller for display on a paging unit display. There is also provided an annunciator or buzzer for signaling that a message has been received.

In accordance with the invention there is further provided an improved wireless optical code scanning device, wherein said device includes an optical code scanner and a two-way radio communication module for communicating with a central station through a data communication network. The improved scanner is arranged to receive and display alphanumeric paging messages from the central station and for providing audio or vibrational signals to a user that a paging message has been received.

In accordance with a further aspect of the invention, there is provided a simplified mobile data communications unit having a display and being devoid of manual data entry devices. The unit includes a display and a control unit. The control unit is programmed to provide a plurality of predetermined alphanumeric messages on the display. Controls, such as push buttons, are provided for selecting at least one of the predetermined messages and functions. A radio module is provided for sending the selected message to a central station. The unit may be further arranged to received alphanumeric messages from the central station, to display the received messages on the display and to provide an annunciation that a message has been received.

In accordance with another aspect of the invention there is provided a mobile data communications unit having a first low resolution display and a second high-resolution display. A radio communications module receives data messages and control signals designating the display to be used for the data. The data is routed to the appropriate display and the user is signaled that a message has been received.

In accordance with another embodiment of the invention there is provided a mobile voice communications unit for use in a wireless data communication system. The voice communications unit communicates to associate itself with an access point of the system and receives data packets representing voice messages and converts the data packets into audio signals. In a preferred arrangement the voice communication unit also converts voice signals into data packets for transmission over the wireless data communication system to the central unit.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT

Figure 1:
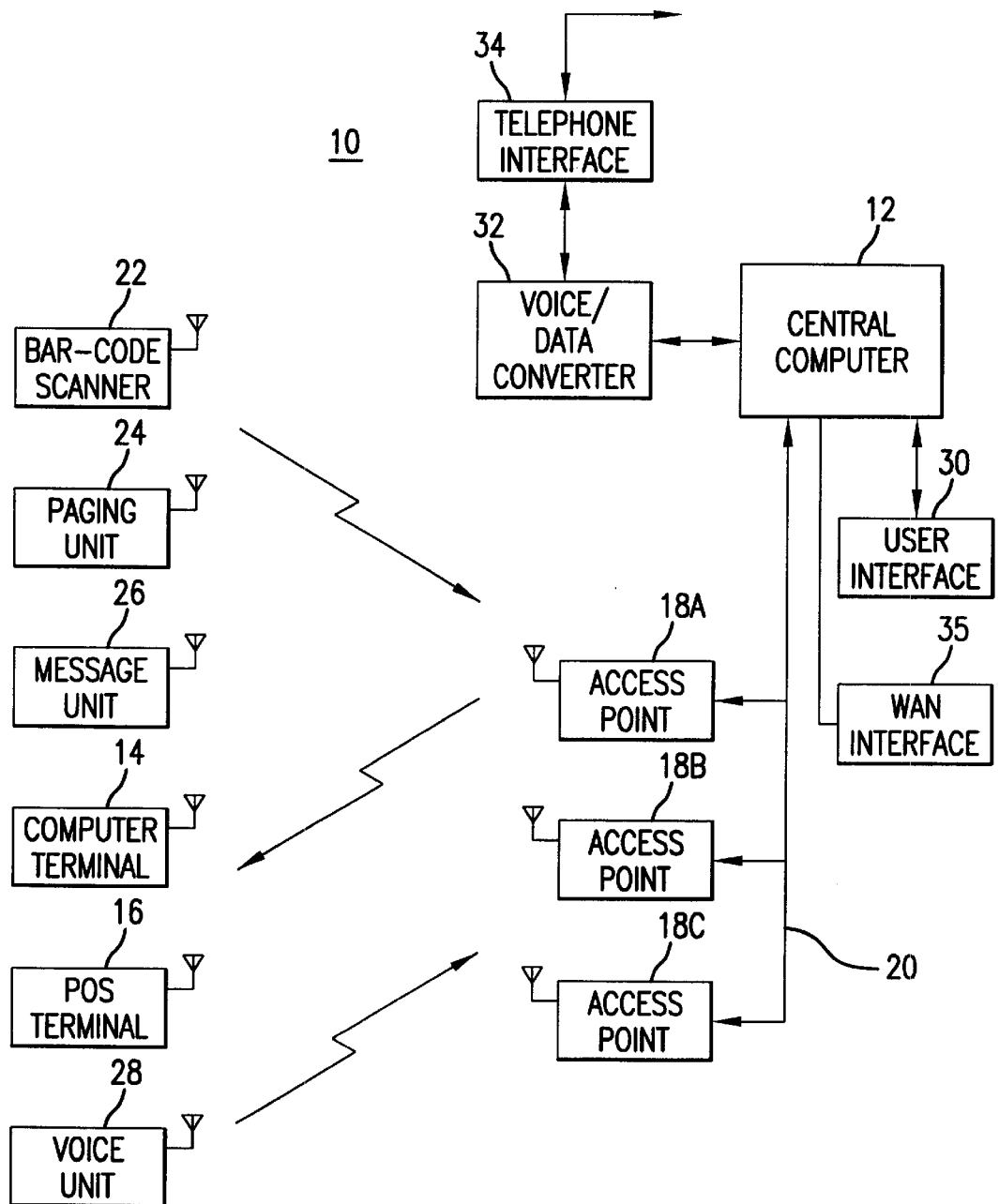
FIG. 1 is a block diagram of a wireless data communication system in accordance with the present invention.

Referring to FIG. 1 there is shown an arrangement of a wireless data communication network 10 having mobile units in accordance with the present invention. As an illustration of a system using the present invention, the system of FIG. 1 can be a radio data communication network known as Spectrum 24, available from Symbol Technologies, Inc., the assignee of the present application, but those skilled in the art will recognize that the present invention is not limited to this particular radio data communication network, but applies to other data communication systems in which the advantages of the invention can be realized.

In a normal data communication installation, a central computer 12 is connected over a wired network 20 to radio data access points 18a, 18b and 18c. The wired network arrangement may be a token ring or Ethernet connection between the access points and the central computer.

The number and physical location of access points 18 is selected according to the radio data communications capabilities required in a facility. In a relatively small office, warehouse or retail store, only a single access point may be required. In a more complex installation, such as a hospital, addition access points may be required to provide increased area coverage and an increased number of communication channels to accommodate a larger number of terminals. FIG. 1 shows conventional radio-connected terminals, including personal computer 14 and point of sale terminal 16. Other conventional data communication terminals may include wireless bar code scanners, lap top computers and the like. Terminals 14 and 16 are provided with a data modem and radio module which are arranged to be compatible with the data communication system 10. In particular, in systems which follow the standards of IEEE 802.11, the mobile units scan the available access point beacon signals and associate themselves through radio data communication with a particular selected access point, in accordance with the strength of the radio signal from the access points, and the number of mobile units which have previously been associate with a selected access point.

While terminal 14 may comprise a notebook type personal computer or other personal data access system, such systems tend to be bulky to carry about and have more capability then is necessary for communicating with most employees. In accordance with the present invention, there are provided a variety of additional mobile units which have more limited data communication capabilities but are nonetheless capable of operating within the protocol of the wireless data system 10 and providing the requisite data. In one example, a paging unit 24 is provided which enables the performance of alphanumeric message paging functions using the data communication capabilities of system 10, but having a simplified user interface and reduced size and weight. In another example a message unit 26 is provided which is arranged to receive alphanumeric paging type messages in a manner similar to the operation of paging unit 24, and is additionally arranged to provide a limited number of user-selectable predetermined messages for communication from the user to other mobile units or the central computer 12. In accordance with another aspect of the invention, bar code scanner 22 is enhanced in functionality to provide for the receipt and possibly the transmission of alphanumeric data messages from and to central computer 12. Still further, in accordance with the invention, a voice terminal 28 may be provided to utilize the data communication channels of system 10 to provide voice messages to a mobile user or to provide voice communications between a mobile user and another person through computer 12. Other and additional message capabilities can be provided for such terminals as described below.

Figure 2:
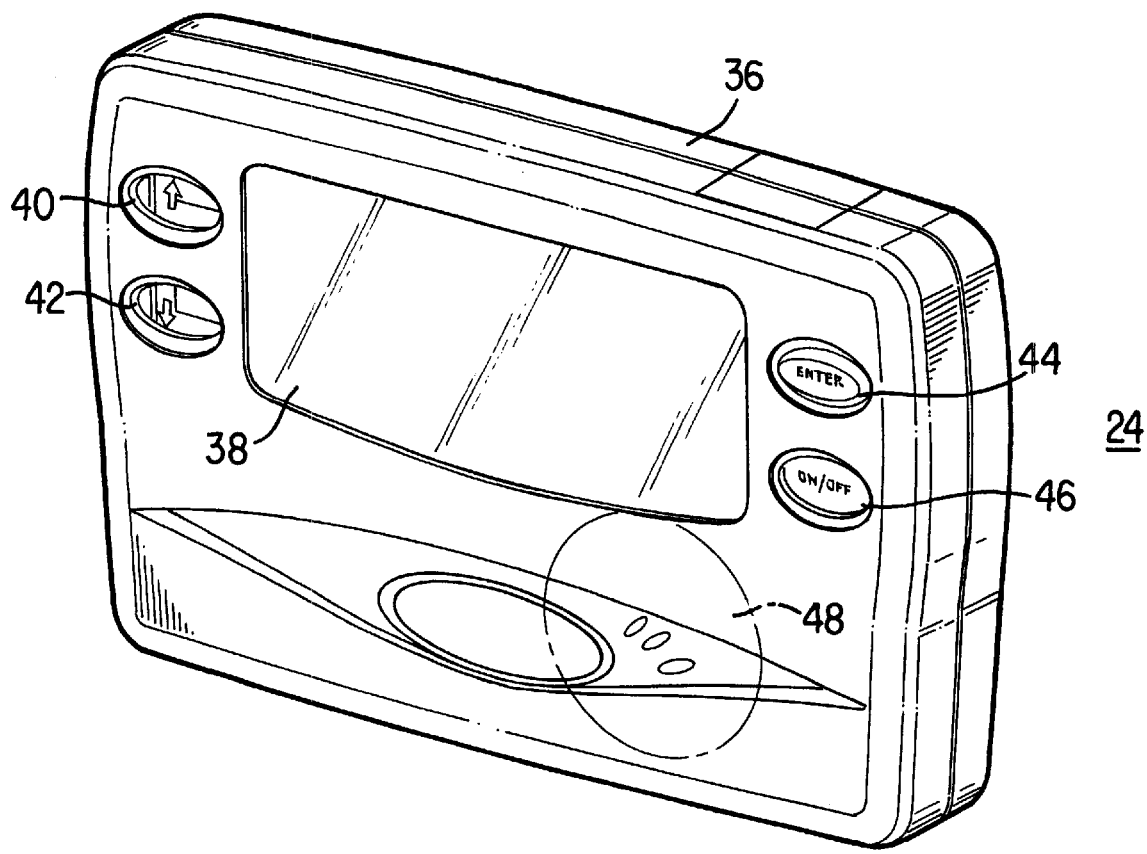
FIG. 2 is a perspective view of a mobile paging unit useable in the system of FIG. 1.

FIG. 2 is a perspective view of a paging unit 24 in accordance with the present invention. Unit 24 includes a housing 36 which is approximately sized to fit in the palm of a hand, so that the unit can be conveniently carried in a pocket or by a clip for attachment to the users clothing. A display 38 is provided on one face of unit 24, and provides four display lines of 20 characters each, for example, by use of a liquid crystal display.

Up-down scrolling buttons 40, 42 are provided to enable the user to scroll through a message having more than 4 lines of alphanumeric data. Buttons 40, 42 can also be used to select a message response indicated by a scrolling highlight or cursor on the display 38, or to select one of a plurality of predetermined outgoing messages, as will be further described. ENTER button 44 is provided to enable the user to acknowledge a paging message, shut off an annunciator signal or send a selected predetermined message to the central computer 12. Power within the unit is controlled by on/off button 46.

Figure 3:
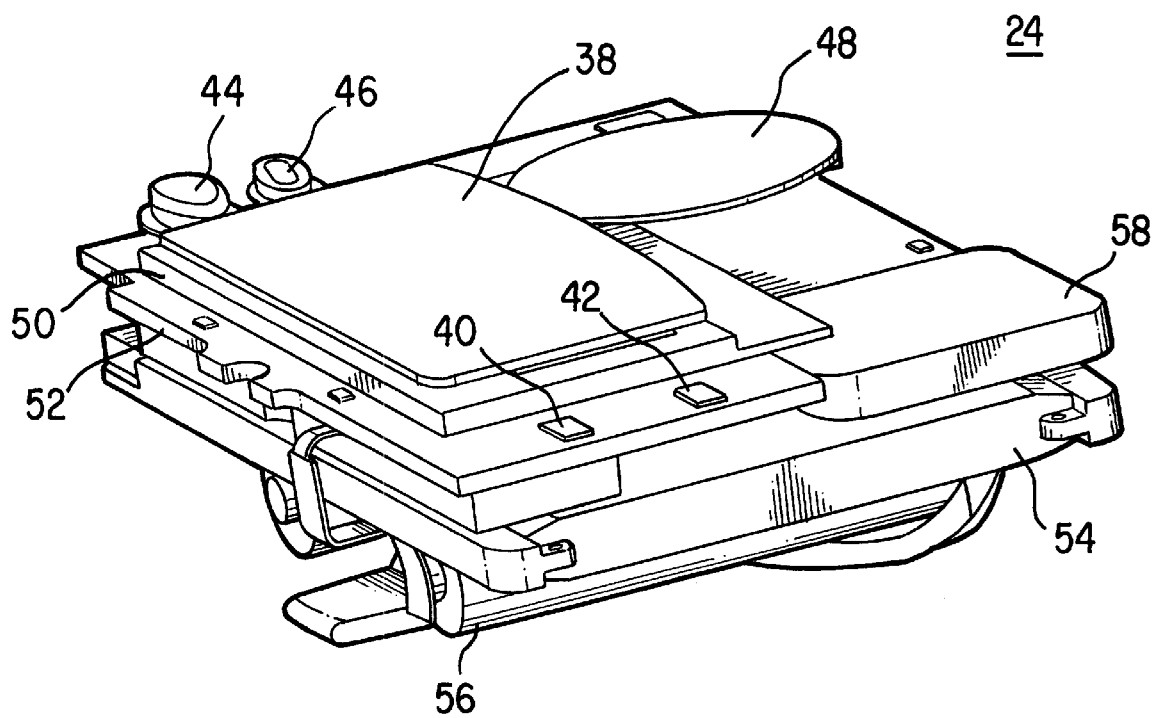
FIG. 3 is a perspective view of the interior arrangement of the FIG. 2 paging unit.

The paging unit 24 of FIG. 2 is devoid of manual data entry devices, in the sense that no keyboard or other means are provided for the user to compose a data message to be sent to the central computer. The absence of manual data entry devices enables paging unit 24 to be small size, light weight and to have significantly lower cost than other prior terminals such as computer 14, point of sale terminal 16 or personal communicators. Unit 24 operates within the environment of data communication system 10 as if it were in fact a personal computer/terminal. Referring to FIG. 3 there is shown the internal arrangements which might be used for paging unit 24 in accordance with the invention. The unit includes a liquid crystal display 38, having a display driver 50, mounted on printed circuit board 52. Printed circuit board 52 further includes operating buttons 40, 42, 44 and 46, the function of which have been previously described. A speaker 48 is provided for giving an annunciation of a paging message to the user. As used herein annunciation refers to any of an audible signal, such as a beep, a vibratory signal or a visual signal, such as a flashing LED. The function of the annunciator is to alert the user that an alphanumeric data message has been received.

Paging unit 24 is provided with a radio circuit board 54, which may be of the same type used to provide radio network communication between a personal computer 14 and the central computer 12 in radio data network 10. An antenna 58 is mounted to the radio circuit board 54. Batteries 56, which may be rechargeable, are provided to power the paging unit.

Figure 4:
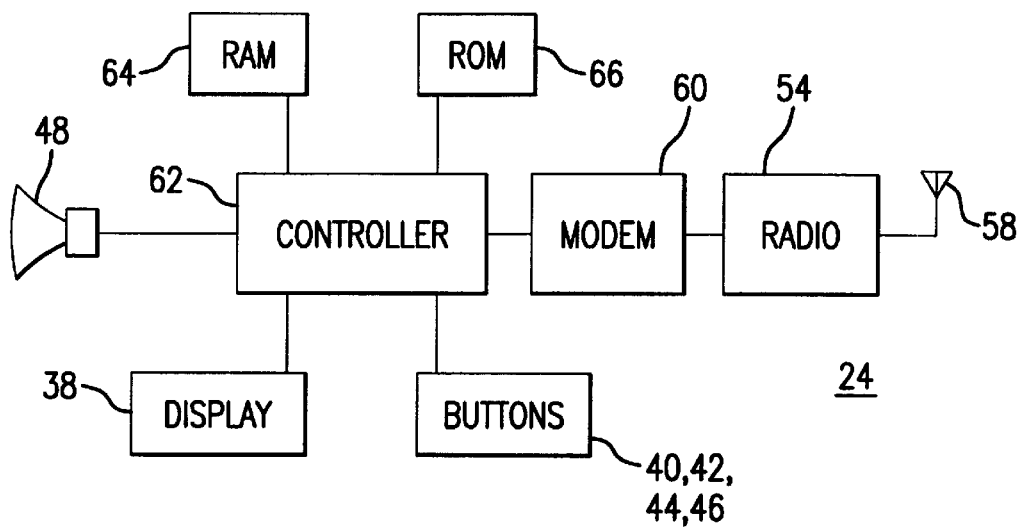
FIG. 4 is a block diagram showing the arrangement of the modules in the FIG. 2 paging system.

FIG. 4 is a block diagram for the paging unit 24, which is also applicable to message unit 26, as will be explained. A controller 62 is connected to modem 60 and data communication radio 54. A program for operating controller 62 is provided in ROM 66 RAM 64 is used to store messages and other data for controller 62. Controller 62 is connected to provide alphanumeric data to display 38 and to receive signals from manual buttons 40, 42, 44, 46. Annunciator 48 is also connected to controller 62. Controller 62 under normal circumstances operates radio 54 to provide the normal signal functions of the data communication system 10 and to cause unit 24 to scan the signal strength of beacon signals from access points 18 and determine the traffic conditions of the available access points 18 of the data communication system 10. On the basis of signal strength, and possibly traffic conditions, paging unit 24 associates itself with an access point 18 by signaling the same, and changes the association as required by the movement of the user through various areas of the facility in which the data communication network is installed. When an alphanumeric paging message is sent by an access point 18 and received by radio 54 of paging unit 24, controller 62 stores the alphanumeric text in RAM 64 and provide the text to display 38. Controller 62 additionally activates annunciator 48 to signal the user that a message has been received. The user can acknowledge the message by depressing enter button 44 to deactivate annunciator 48. If the data message exceeds 4 lines in length, buttons 40 and 42 can be used to scroll the entire message on display 38.

In the arrangement of FIG. 4, if an additional paging message is received it can be stored in RAM 64 while the user is reviewing a first message, and by depressing scroller buttons 40, 42 the user can thereafter review all messages received.

The sophisticated nature of the data communication system of the present invention enables the user to provide responsive messages to a page and to also provide predetermined outgoing messages to be sent to the central computer 12 and thereafter to other users of the system.

In one example, a paging message can include alternate predetermined responses. For example, a message may read:

How late can you work today?
9:00 P.M.?
10:00 P.M.?
11:00 P.M.?

Upon reviewing this message the user can highlight one of the predetermined time responses which are contained in the original message using the scroll buttons 40, 42. By depressing enter, controller 62 formulates a responsive data message to be sent through the central computer 12 by radio module 54.

Figure 5:
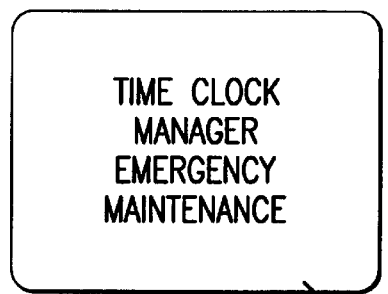
FIGS. 5 and 6 illustrate message selection displays which can be provided in an enhanced version of the unit of FIG. 2.
Figure 6:
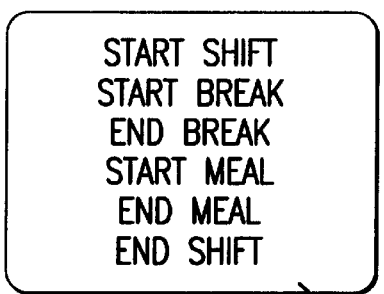

In a further refinement of paging unit 24, there is provided a message unit 26 using the hardware arrangement as shown in FIG. 4 with additional programs, so that message unit 26 enables the user to send preselected data message to the central computer 12 without the need for a manual data entry device. As used herein, manual data entry devicek means a device such as a keyboard, alphanumeric touch screens, handwritten character recognition system and the like which enables a user to enter any arbitrary alphanumeric data message. In accordance with this aspect of the invention ROM 66 is provided with predetermined alphanumeric data messages, which can be selected by the user using one or more sequential displays and using scroller buttons 40, 42 to designate the predetermined message to be sent. One possible initial display screen is shown in FIG. 5 wherein the user can select among functions concerning which an outgoing message is directed. For example, by highlighting the, TIME CLOCK line of display 38 in FIG. 5, controller 62 will provide a second selectable display 38, shown in FIG. 6 indicating possible time clock entries that a user may wish to select and signal to the central computer 12. Those predetermined messages can be selected by operation of scrolling buttons 40, 42 and sent by depressing lenterk button 44.

Accordingly, the message unit 26, while having the same hardware configuration as paging unit 24, has the additional functionality provided by software in ROM 66 which enables the user to communicate messages without having to carry about a bulky and expensive device with manual data entry capability.

Figure 13:
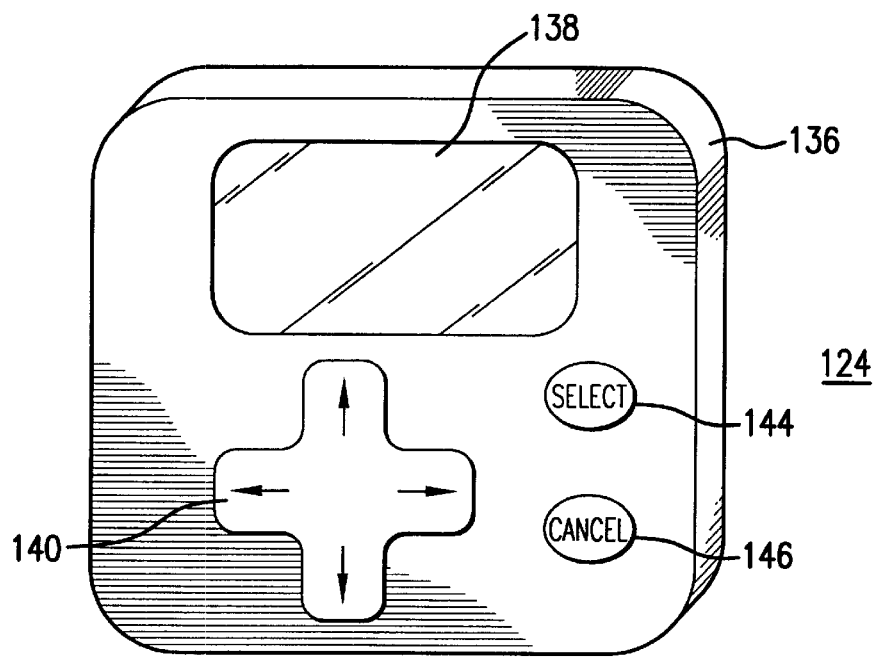
FIG. 13 is a perspective view of an alternate message or paging unit.

An alternative arrangement for a pager or message unit 124 is shown in FIG. 13. The unit includes a case 136 having a display 138. A four-way rocker button 140 is provided for movement of the cursor on the display to select options or responses to pager messages. Select button 144 is provided to select a function or message designated on the display. A cancel button 146 is provided to "undo" the last selection.

Figure 14:
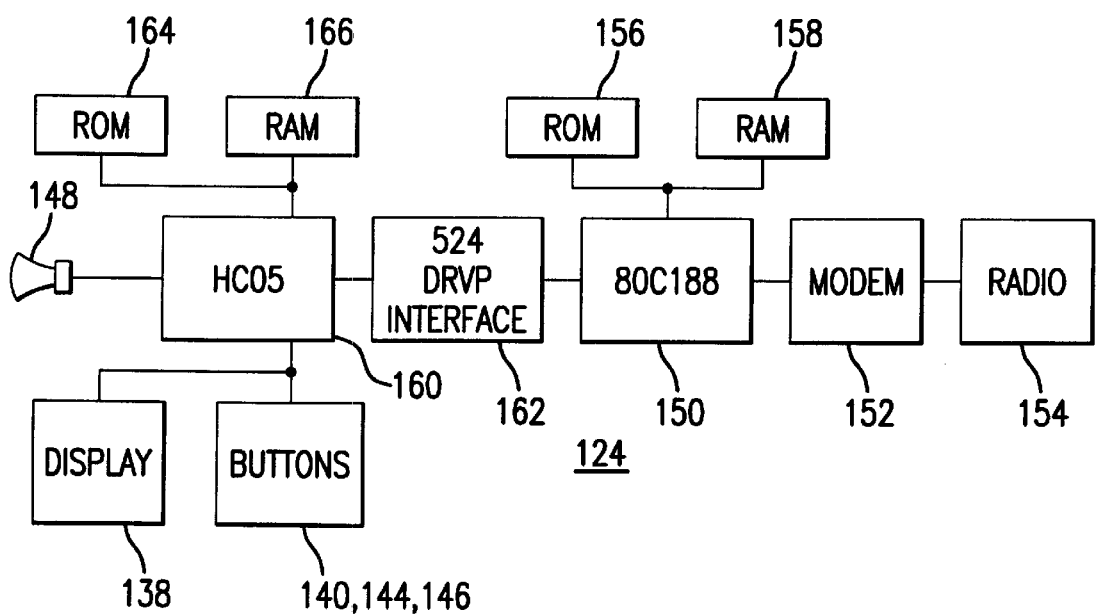
FIG. 14 is a block diagram of an alternate message or paging unit.

An alternate block diagram for the pager or message unit 124 is shown in FIG. 14. The unit includes a mobile unit radio module comprising a Motorola 80C188 processor 150, associated ROM 156, and RAM 158, modem 152 and radio 154. Processor 150 operates on firmware provided in ROM 156, such as the Galaxy protocol firmware of Symbol Technologies, Inc. and associated with the interface protocol functions of The Spectrum 24 system. Processor 150 is coupled through an interface module 162 to a second processor 160, such as an Motorola HC05 with its own ROM 164 and RAM 166. Interface module 162, which may comprise an S24 DRVP low-level polled interface module, serves as a stack to receive data messages and status data between the 80 C188 processor and the HC05 processor.

The HC05 processor 160 acts to service the display 138, buttons 140, 144, 146 and the annunciator 148. In addition, processor 160 provides the message selection function, when messages are to be selected from a predetermined set. Data messages received from the access point are provided to interface 162 and processor 160 reads those messages for display 138. Likewise, messages selected from the stored preselected messages for transmission are provided to interface module 162 by processor 160. The firmware in processor 150 periodically examines interface module 160 for outgoing messages and performs the transmission function.

Another function provided by processor 160 is power management of the pager/message unit 136. When the unit goes out of range of the radio network, the unit will attempt to associate with an access point. After a few hours, the processor 160 will place the unit in a low power "sleep" mode. The unit is reactivated from the sleep mode by pressing any button, whereupon the unit attempts to associate with an access point of the system. In this way, when an employee takes the unit home, the unit goes into low power mode to save the batteries until the employee returns to the workplace and activates the unit by pressing a button.

In addition to the "sleep" mode, the user may select a "radio off" mode, wherein the unit is no longer active to send and receive messages, but wherein previously received messages can be displayed. The scroll and select function can be use to enter or leave the "radio-off" mode.

The firmware in the pager is also arranged to provide for pager configuration. Preferably configuration data, including user name, IP address and MAC (IEEE) address is downloaded to the pager in a configuration message and loaded into the pager memory, which is preferably non-volatile FLASH memory, which prevents loss of data when power is lost, e.g., by battery run down or during battery change. In addition to user configuration, the network can be used to download custom messages to be installed for selection by the pager user. In addition, a list of users can be downloaded with associated names, IP addresses and, optionally, MAC addresses. Data can be provided as a complete listing, replacing the current database, or as additional data to augment a previously stored database.

In the pager application, the network operations of the pager mobile unit can be modified to lower power consumption and thereby extend battery life. First, the pager can be configured to disable receipt of network broadcast messages. Operating in this mode, the pager's configuration request message informs the host of the pager's MAC address and the host includes this address when sending a response or page to the pager.

Further, the pager can be configured to receive messages at less frequent intervals, e.g., 10 seconds or more. In this event, the beacon messages indicate which low power mobile units have messages pending at the access point and, when appropriate, the radio portion of the pager is configured to receive pending messages.

Additionally, the pager can be configured to periodically enter a low power mode wherein beacon messages are not tracked, but only hop times are tracked. The pager would wake-up, e.g., every 30 seconds and transmit a poll frame to the access point. If the access point has traffic for the pager, it sends the data packet. If there is no traffic, the access point acknowledges the poll.

A further power saving operation is to inhibit the function wherein the pager scans all frequency channels every 30 seconds. The pager can scan frequencies only when it has lost or is about to lose communications with its associated access point. Otherwise, the pager simply transmits a probe frame every two to three minutes to keep the connection alive.

The data messages of the system include sequence numbers that are transmitted to identify a message. When received, either at a pager or an access point, an acknowledgment is sent indicating the sequence number. When the message is read by the user, a further "message read" acknowledgment is also sent. In the event a message queue in a pager is full, the response can so indicate.

The pager user can forward a received message by selecting a forward recipient from the stored list of users and executing a message forward function.

A further function is a "cancel message" which can be sent by the originator to cancel an earlier message, which is identified by sequence number.

The system of the invention is also capable of performing a sequential page function because of the use of two-way paging. In the case of critical messages, where a response from management is required, a list of pagers may be provided. Where the first pager is not available because it is out-of-range, or turned off because the user is in a meeting, the central computer will respond to the absence of an acknowledgment signal and initiate sequential page messages to the next person on the list until the page is acknowledged. The successive paging can be terminated upon receipt of an acknowledgment or reply.

The pagers preferably use non-volatile, e.g., FLASH memory. The pager is programmed so that an acknowledgment is not sent until the message is stored in the FLASH memory. Storage of the message includes a header, which is provided with a status bit locations indicating, inter alia, whether a message has been read. Status bits are written from a "one" to "zero", to record events such as reading or deleting a message. Periodically, the FLASH memory is compressed by copying records to a buffer, erasing the FLASH sector and copying the records from the buffer to the FLASH, eliminating messages with a delete status bit set to zero.

Figure 7:
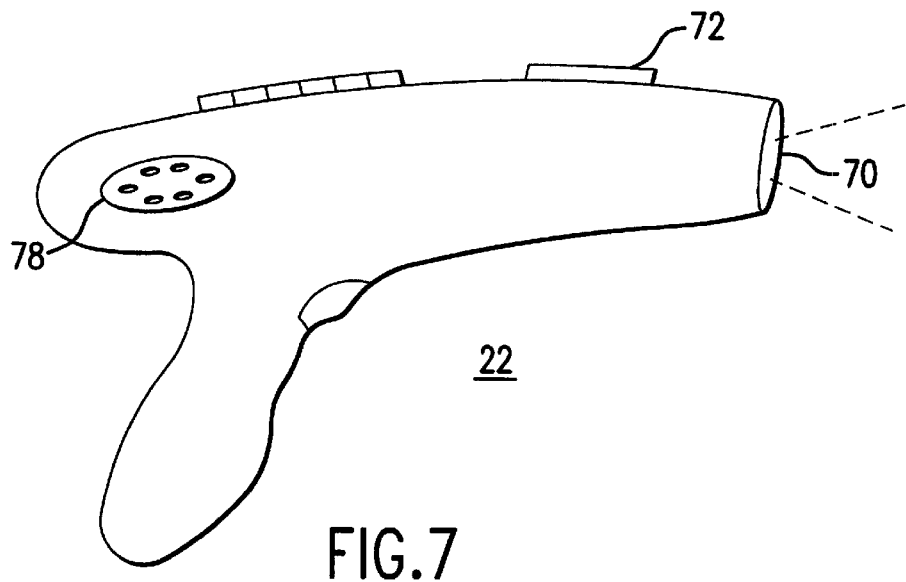
FIG. 7 is a wireless bar code scanner unit having paging functions in accordance with the present invention.

FIG. 7 illustrates an enhanced wireless remote scanner unit 22 for use in data communication system 10 of the present invention. Scanning unit 22 is similar in overall configuration to wireless data network scanner devices which are currently available from Symbol Technologies, Inc. and which enable a user to perform scanning and data communication functions, such as inventory, location functions, and price-check functions. By the addition of an annunciator 78 and data message software, scanner 22 is enabled to receive paging message as described with respect to message unit 26. Such messages can be displayed on the display 72 usually provided on such scanners.

Figure 8:
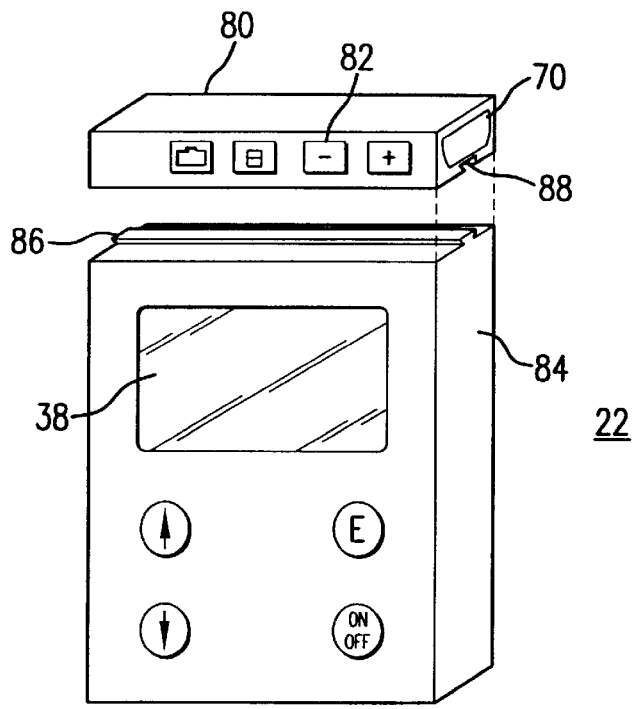
FIG. 8 is a paging unit in accordance with the present invention having a detachable bar code scanner system.

FIG. 8 shows an alternate arrangement for a combined paging and bar code scanner unit 84 which includes a main body having a display screen 38 and a detachable scanner module 80, which connects to unit 84 using mechanical and electrical connectors 86, 88. Accordingly, the main body of unit 84 can be fixed by a clip, for example, to a users belt while scanner 80 is being used. Scanning unit 80 includes an optical scanning device 70, which may be a compact unit as described in U.S. patent application Ser. No. 631,364, now U.S. Pat. No. 6,059,188. It also includes scanning operating buttons 82. Scanning unit 80 is shown in greater detail in FIG. 9 and contains in additional to scanner 70, a decoder 90, scanner controller 92, having a communication port 94, and memory 96. Battery 98 of scanner module 80 is provided with connectors to be recharged from the battery of unit 84 when module 80 connected to unit 84.

Figure 9:
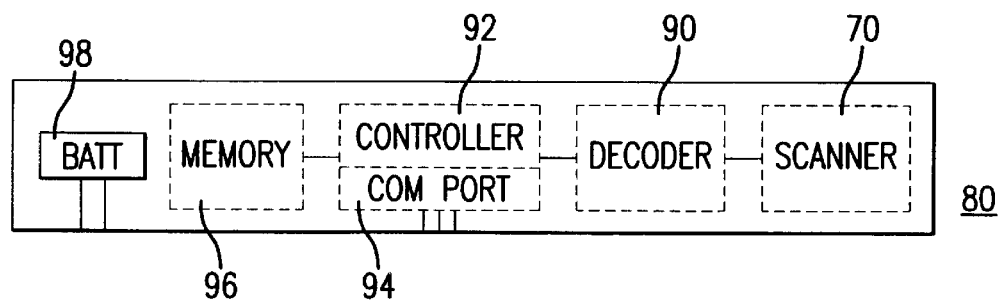
FIG. 9 illustrates further detail of the bar code scanner of FIG. 8.

The paging unit and scanner 84 shown in FIGS. 8 and 9 is appropriate for use by management personnel, who perform scanning functions only on an occasional basis, for example, to provide a price check for a customer. Using communication port 94 the detachable scanner can communicate data to controller 62 shown in FIG. 4 to be relayed by radio 54 to the central computer 12. It is noted that module 80 can be used either while connected to unit 84 or when detached therefrom.

Figure 10:
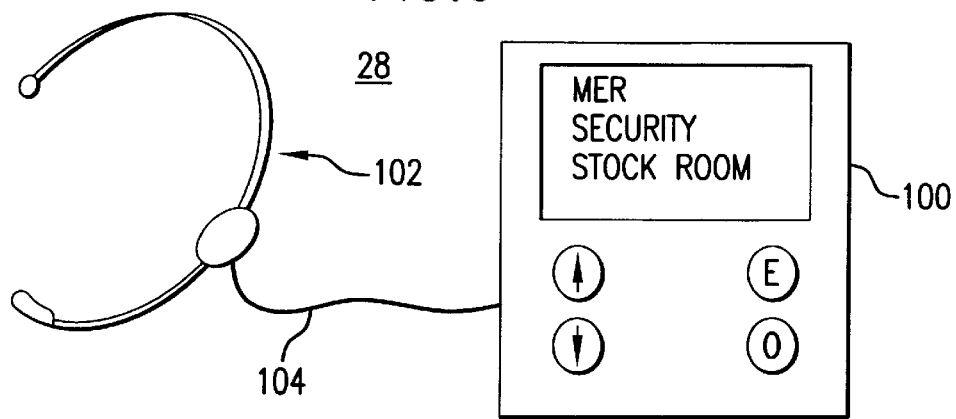
FIG. 10 is a mobile data communication unit arranged to provide voice communication.

FIG. 10 illustrates a configuration for a voice unit 28, providing data and voice communication in a compact unit. The unit 28 includes an electronics module 100 and a separate headset 102, which may include an earphone or both an earphone and microphone. Headset 102 may be connected to module 100 by a wire 104 or by a short range wireless link. Alternately the headset 102 may be replaced by a microphone and speaker built into unit 28.

Figure 11:
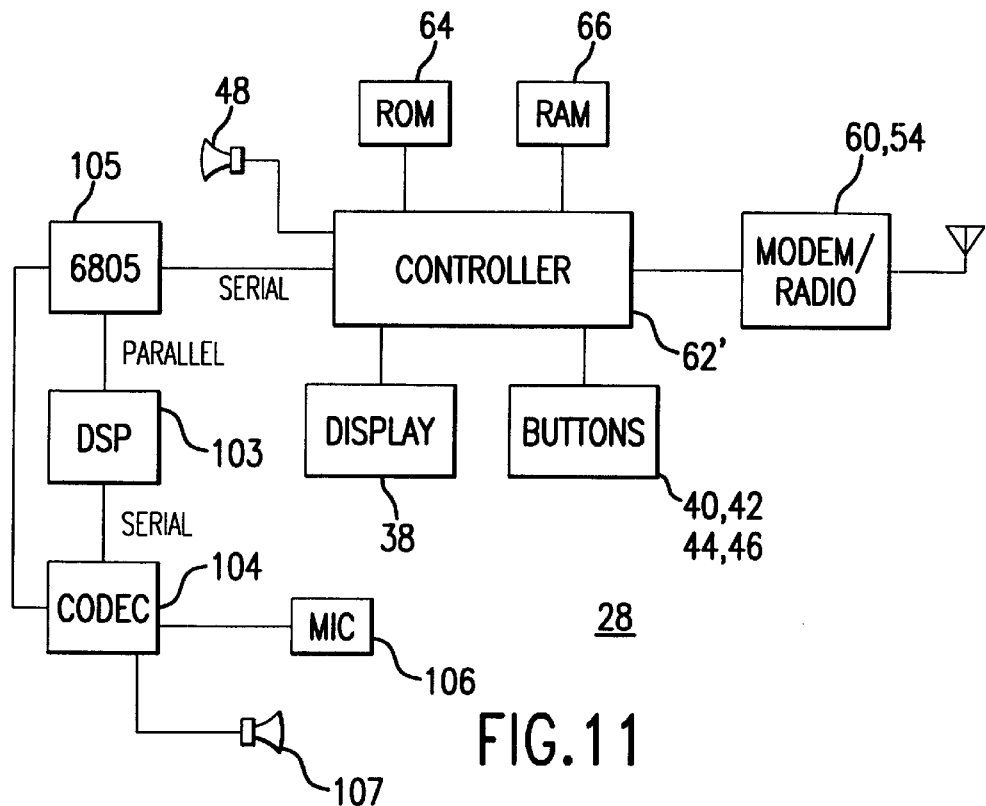
FIG. 11 is a block diagram of the FIG. 10 unit.

FIG. 11 is a block diagram of the voice communication unit 28. The unit includes a modem and radio 60, 54, controller 62' and associated ROM 64, RAM 66, display 38, buttons 40, 42, 44, 46, and annunciator 48, which are the same as used for the pager/message unit 24. The controller 62 has additional programming to support voice communication function.

Voice communication unit 28 further includes a processor 105, such as a Motorola 68C05, which performs the function of interfacing the voice communication to the serial port of controller 62. A Codec interface chip 104, such as a Thomson ST5090, is provided to interface the digital circuits to the microphone 106 and speaker or earphone 107. A DSP Group CT8015 voice compression unit 103 is provided to compress the digitized voice signals from 64 K bits/sec to 8 K bits/sec to reduce the data transmission requirements. This unit also supports full duplex operation and echo cancellation where speakerphone operation is implemented.

Processor 105 receives commands and data from software running on controller 62' and provides them to the DSP 103 and Codec 104. Processor 105 acts like a "smart" UART. Since data is compressed to 8 K bits/sec, the interface to the controller serial port can be at 9600 baud. While support is provided for a full duplex operation, the system will usually only provide voice data in one direction at a time due to "silence suspension".

The controller 62' is provided with additional programming that enables the setting up of telephone connections and the formatting and transmission of digitally encoded voice between units 28 or through the central computer 12, via a telephone network to other locations. Packets of voice data are sent over the network the same as other data messages. The controller 62' recognizes messages as voice-encoded data from the message header and routes the data to the voice components.

It will be recognized that the system may be arranged only for paging type voice messages, without return voice, eliminating the need for the microphone.

The same telephone arrangement can also be implemented by connecting the components to the serial port of the processor in other mobile units of the wireless network.

It will be recognized that with appropriate programming a single processor can perform both the interface and voice compression functions of units 103 and 105.

As an alternative to the headset 102, a speaker and optionally a microphone can be built into the paging unit.

Central computer 12 can route the voice-encoding data packets to another voice unit 28, to enable personnel to directly communicate. A selection of the desired connection can be made by using keys 40, 42 to highlight the unit of the destination of the voice communication. By pressing enter a user can initiate a voice communication. As an alternate to communicating between voice units 28, the central computer 12 may be provided with a voice to data converter 32 and telephone interface 34 to enable a user to talk to another person over a conventional telephone system. Alternately voice communication may be synthesized or recognized by computer 12.

Figure 12:
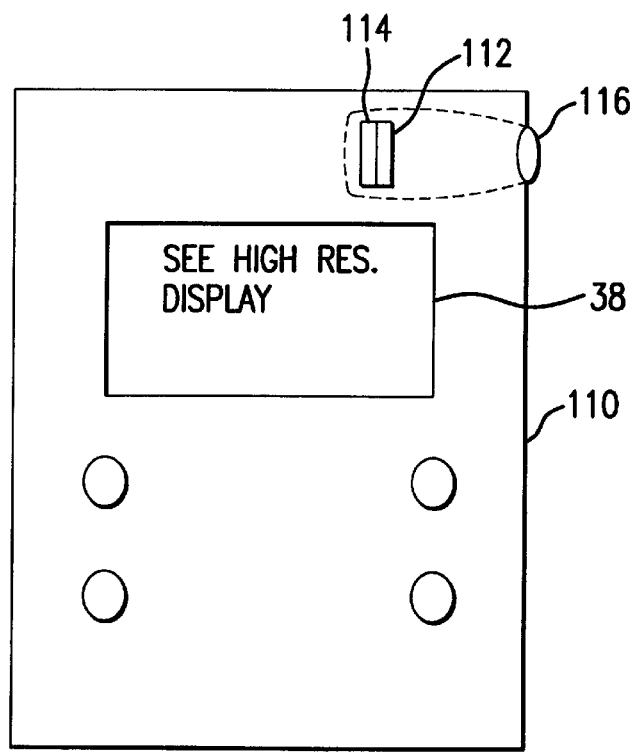
FIG. 12 is a paging unit in accordance with the invention having high resolution and low resolution displays.

FIG. 12 illustrates an enhanced message unit 110 which in addition to the low resolution display 38 includes a high resolution display 112 and display driver 114. Display 112 has a high resolution display format, comprised of a microchip screen having approximately the same resolution capacity as a television screen. High resolution display 112 is viewable through a viewing lens 116.

In the event that a data message sent to unit 110 includes a high resolution display, such as a large amount of alphanumeric data, pictorial or graphic data, a message loaded to display 38 will indicate that the user should view the complete data message on high resolution display 112 through viewing lens 116.

The data communication system 10 of FIG. 1 will provide new and enhanced operation within a facility using the simplified data and voice terminals 22, 24, 26 and 28. All such terminals can support a page message function which is originated by entering a page address, page message, possibly with alternate responses and send command to computer 12 through user interface 30 or remote terminals 14 or 16. In multi-facility businesses, such as chain-stores, a paging message can be entered into computer 12 from a remote computer facility connected over a wide area network interface 35.

In the preferred wireless data communication system 10, each of the terminals associates itself with one of the access points 18. The access point keep track of the terminals which have become associated with it and respond to messages for that terminal. Accordingly, a data paging message, or in the case of voice unit 28, a data paging or voice message, will be routed by computer 12 over the wired network 20. Access point 18 which is associated with the destination terminal will recognize the address information associated with the destination terminal. Thereafter the data or voice encoding data message is sent to the terminal by access point 18. Terminal originated data messages or voice message are routed to the computer 12 through the associated access point and thereafter to the appropriate destination, which may be another terminal, the user interface, the wide area network, telephone interface or the computer 12, itself, as in the example of time clock messages.

In a preferred alternative embodiment of the present invention, the two-way pagers can be used to receive messages upon the occurrence of a predetermined event. For instance, if a specific bar code is scanned for purchase at a point of sale register, a message could be sent to the store clerk to retrieve the corresponding item from the storage room for pick-up by the customer. It is also preferred that the pager provide an acknowledge signal back to the system controller and/or the message originator that the message has been received, read and/or discarded (i.e., action completed).

If the two-way pager has a bar code scanner or CCD type imager, the recipient of a message could simply respond to a message, or create a new "message," by scanning a bar code or capturing an image. Such action would create a preformatted data file, i.e., an HTML type page of data, and transmit the data to a specific IP address over the wireless network. The IP address could be the source IP from an original message or a new IP selected from memory. Using this technique, one store clerk could simply capture data and forward it to another store clerk who also has a two-way pager of the present invention.

The bidirectional wireless radio on the two-way pager also makes it possible to extend the range of the system access points. If the pager is out of range of an access point, it may try to communicate with another pager which is closer to an AP. The message may then be relayed by the intermediate pager radio system which functions as a micro access point until the pager connects to a dedicated access point.

Other functions are available in the system 10 using the paging unit 24. For example, since each access point 18 obtains knowledge of the terminals associated with it, when one access point corresponds to a store exit or parking lot, the store exit access point will become aware of the paging unit in the exit area, when an employee or customer leaves the premises with a paging unit 24. An appropriate message can be sent requesting return of paging unit 24. Customers may have been provided with paging units while shopping so that store personnel can signal when a special order is ready to be picked up.

The units described have a minimum number of buttons, but it will be recognized that additional specialized buttons may be provided, for example, to switch the unit to message sending operation from message receiving, to activate voice operation, or to delete messages previously received.

While there has been described what are believed to be the preferred embodiments of the present invention those skilled in the art will recognize that other and further changes may be made thereto without departing from the spirit of the present invention, and it is intended to claim all such changes and modifications as fall within the true scope of the invention.

What is claimed is:

1. A mobile scanning-unit, comprising:
   a scanner for scanning optical codes;
   a programmed controller for controlling the scanner and receiving scanned data therefrom;
   a radio module for data scanning;
   a display, the display having a first screen having a first resolution and a second screen having a second resolution, and wherein the second resolution is higher than the first resolution;
   an annunciator;
   an antenna;
   a plurality of user-depressable buttons;
   wherein the radio module is programmed to receive alphanumeric paging messages, to provide the alphanumeric paging messages to the display, and to engage the annunciator to signal receipt of a paging message;
   wherein said controller is arranged to receive a first data message, to display the first data message on the first screen, to receive a second data message, to display said second data message on the second screen, and to signal a user to refer to the second screen.

2. The mobile scanning unit as in claim 1, wherein the radio module is further programmed to disengage the annunciator upon activation of a user-depressabe button.

3. The mobile scanning unit as in claim 2, further comprising a plurality of memory elements, wherein the radio module is programmed to store the alphanumeric paging messages in the plurality of memory elements.

4. The mobile scanning unit as in claim 3, wherein a plurality of pre-selected responses are also stored in the plurality of memory elements, and wherein the pre-selected responses may be transmitted by the radio module based on the activation of the plurality of user-depressable buttons.

5. The mobile scanning unit as in claim 4, wherein the plurality of user-depressable buttons includes a button for upward scrolling, a button for downward scrolling, a button for selecting highlighted material and a button for canceling functions.

6. The mobile scanning unit as in claim 4, wherein the display includes at least four lines of displayable text.

7. The mobile scanning unit as in claim 4, further comprising a lens and wherein the second screen is more easily viewable using the lens.

8. A system for scanning, comprising:
   (1) at least one mobile scanning unit, each comprising:
      (a) a scanner for scanning optical codes;
      (b) a radio module;
      (c) a display, the display having a first screen having a first resolution and a second screen having a second resolution, and wherein the second resolution is higher than the first resolution;
      (d) an annunciator;
      (e) a power source and a power manager;
      (f) a plurality of memory elements; and
      (g) a plurality of user-depressable buttons;
   (2) a wired network; and
   (3) at least one access point;
   wherein the at least one access point is capable of transmitting transmission data from the wired network to the at least one mobile scanning unit via a wireless medium and receiving reception data from the at least one mobile scanning unit to the wired network via a wireless medium;
   wherein the at least one access point forms a transmission area, the transmission area including the space where association to the at least one access point is possible by the at least one mobile scanning unit; and
   wherein the at least one access points broadcasts a periodic beacon via a wireless medium;
   wherein each of the at least one mobile scanning unit attempts to associate with the at least one access points by broadcasting a poll via a wireless medium on a first periodic basis unless otherwise instructed by the power manager within the specific mobile scanning unit; and
   wherein at least one of the at least one mobile scanning unit is arranged to receive a first data message, to display the first data message on the first screen of the mobile scanning unit, to receive a second data message, to display the second data messages on the second screen of the mobile scanning unit, and to signal a user to refer to the second screen.

9. The system as in claim 8, wherein the transmitting data is capable of including data obtained from the use of the scanner of at least one of the at least one mobile scanning unit.

10. The system as in claim 9, wherein the transmission data and the reception data include data representing the IP address associated with each of the at least one mobile scanning unit, and wherein the wired network is connected to the Internet.

11. The system as in claim 9, herein the transmission data and the reception data include data representing the MAC address associated with each of the at least one access point.

12. The system as in claim 9, wherein the transmission data and the reception data include at least one unique message each of which is identified by a unique sequence number;
   and wherein the transmission data and the reception data include information associated with each of the at least one unique message that is identified by the unique sequence number associated with each of the at least one unique message.

13. The system as in claim 12, wherein a first of the at least one mobile scanning unit sends a first of the at least one unique message to a second of the at least one mobile scanning unit via the at least one access point, wherein the first of the at least one unique message is identified by its unique sequence number.

14. The system as in claim 9, wherein the transmission data comprises a plurality of alphanumeric paging messages that may be either individual paging messages that are designated by the wired network for a particular one of the at least one mobile scanning unit associated with the wired network or network paging messages that are designated by the wired network for each of the at least one mobile scanning unit associated with the wired network.

15. The system as in claim 14, wherein the at least one mobile scanning unit is programmable to disable receipt of the network paging messages.

16. The system as in claim 9, wherein the power manager is programmed to instruct the radio module within a specific mobile scanning unit to cease attempting to associate with the at least one access point on the first periodic basis after a predetermined length of time has passed since the last successful association between the specific mobile scanning unit and the at least one access point.

17. The system as in claim 16, wherein the predetermined length of time is about 1 hour.

18. The system as in claim 16, wherein the power manager within the specific mobile scanning unit is further programmed to instruct the radio module within the same specific mobile scanning unit to resume attempting to associate with the at least one access point on the first periodic basis upon activation of one of the plurality of the user-depressable buttons within the same specific mobile scanning unit.

19. The system as in claim 9,
wherein the power manager within a specific mobile scanning unit is programmed to instruct the radio module within the same specific mobile scanning unit to cease attempting to associate with the at least one access point on the first periodic basis;
wherein the radio module within the same specific mobile scanning unit is programmed to attempt to access the periodic beacon transmitted by the at least one access points, the periodic beacon including information related to the presence or absence of pending messages for the particular mobile scanning unit within the wired network;
and wherein, if there are pending messages for the same specific mobile scanning unit, the same specific mobile scanning unit is programmed to associate with the at least one access point to obtain the pending messages.

20. The system as in claim 19, wherein the instruction to the radio module within the same specific mobile scanning unit to cease attempting to associate with the at least one access points on the first periodic basis results in less drain on the power source of the same specific mobile scanning unit.

21. The system as in claim 9,
wherein the power manager of a specific mobile scanning unit is programmed to instruct the radio module of the same specific mobile scanning unit to attempt to associate with the at least one access point on a second periodic basis, wherein the second periodic basis is less frequent than the first periodic basis;
wherein the attempt to associate with the at least one access point on a second periodic basis comprises:
the transmission of the poll by the same specific mobile scanning unit;
if there are pending messages for the same specific mobile scanning unit, the receipt of the pending messages from the at least one access point; and
if there are no pending messages for the same specific mobile scanning unit, the receipt of an acknowledgement from the at least one access point.

22. The system as in claim 21,
wherein the power manager of the same specific mobile scanning unit is programmed to instruct the radio module of the same specific mobile scanning unit to attempt to associate with the at least one access point on the second periodic basis at all times other than when the same specific mobile scanning unit is near the edge of the transmission area.

23. The system as in claim 9, wherein the annunciator of a specific mobile scanning unit is programmed to activate when the same specific mobile scanning unit is near the edge of the transmission area.

24. The system as in claim 9, wherein each of the at least one mobile scanning unit associates with the specific access point that is in closest proximity.

25. The system as in claim 9, wherein a first of the at least one mobile scanning unit that is unable to associate with the at least one access point is capable of associating with a second of the at least one mobile scanning unit, and wherein the second of the at least one mobile scanning unit is capable of functioning in the same manner as one of the at least one access point.

26. The system as in claim 9, wherein the transmission data and the reception data use a TCP/IP protocol, and wherein the wired network is connected to the Internet.

27. The system as in claim 9, further comprising a packet data scanning system comprising at least one converter for converting voice signals into a sequence of data signals, at least one assembler for assembling the data signals into data packets, and at least one resolver for sequentially converting the data signals in the data packets to voice signals;
and wherein the transmission data and the reception data comprise the data packets.

28. The system as in claim 27, wherein each of the at least one resolver is located on one of the at least one mobile scanning unit and wherein each of the at least one resolver is further capable of converting the data signals in the data packets to alphanumeric characters using voice recognition and displaying the alphanumeric characters on the display of the at least one mobile scanning unit.

* * * * *